United States Patent
Murakami et al.

(10) Patent No.: US 8,680,295 B2
(45) Date of Patent: Mar. 25, 2014

(54) PROCESS FOR PRODUCING BIS(THIETANYLTHIO)DITHIASTANNOLANE

(75) Inventors: Masakazu Murakami, Omuta (JP); Tomoyuki Ando, Omuta (JP); Seiichi Kobayashi, Omuta (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 140 days.

(21) Appl. No.: 13/452,038

(22) Filed: Apr. 20, 2012

(65) Prior Publication Data

US 2012/0203011 A1 Aug. 9, 2012

Related U.S. Application Data

(62) Division of application No. 12/527,851, filed as application No. PCT/JP2008/000265 on Feb. 19, 2008, now abandoned.

(30) Foreign Application Priority Data

Feb. 20, 2007 (JP) .................. 2007-039774

(51) Int. Cl.
*C07D 327/02* (2006.01)
(52) U.S. Cl.
USPC .................. 549/3; 528/9; 528/373
(58) Field of Classification Search
USPC .......................... 528/9, 373; 549/3
See application file for complete search history.

(56) References Cited

U.S. PATENT DOCUMENTS

2007/0191615 A1   8/2007   Otsuji et al.
2010/0298519 A1 * 11/2010   Nakamura et al. ............ 528/9

FOREIGN PATENT DOCUMENTS

| EP | 1 731 547 A1 | 12/2006 |
|---|---|---|
| EP | 2 006 319 A2 | 12/2008 |
| JP | 10-130250 A | 5/1998 |
| JP | 2003-327583 A | 11/2003 |
| WO | WO 2005/095490 A1 | 10/2005 |
| WO | WO 2007/099702 A1 | 9/2007 |
| WO | WO 2007/125636 A1 | 11/2007 |
| WO | WO 2007/148439 A1 | 12/2007 |

OTHER PUBLICATIONS

International Search Report (Form PCT/ISA/210) of Application No. PCT/JP2008/000265 dated May 27, 2008.
International Search Report (Form PCT/ISA/210) of Application No. PCT/JP2008/000264 dated May 27, 2008.
Extended European Search Report issued in corresponding European Application No. 08 71 0418 dated Feb. 2, 2010.

* cited by examiner

*Primary Examiner* — Shane Fang
(74) *Attorney, Agent, or Firm* — Buchanan Ingersoll & Rooney PC

(57) ABSTRACT

A process for producing bis(thietanylthio)dithiastannolane of the following formula:

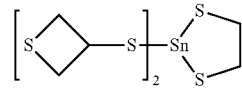

involving the reaction of tetrakis(thietanylthio)tin having the following formula:

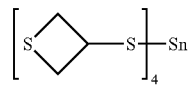

with 1,2-ethandiethiol.

2 Claims, No Drawings

PROCESS FOR PRODUCING BIS(THIETANYLTHIO)DITHIASTANNOLANE

CROSS-REFERENCE TO RELATED APPLICATION

This application is a divisional of U.S. patent application Ser. No. 12/527,851 filed on Aug. 19, 2009, which is the National Stage of International Application No. PCT/JP2008/000265, filed on Feb. 19, 2008, which claims the benefit of priority from Japanese Patent Application No. 2007/039774, filed on Feb. 20, 2007, the contents of each are herein incorporated by reference in their entirety.

TECHNICAL FIELD

The present invention relates to a thietane compound, a polymerizable composition containing the compound and use of the composition.

BACKGROUND ART

In late years, a transparent organic polymer material has been used as a transparent material in place of an inorganic glass, and has been used, for example, for an optical resin or the like. There has been demanded an optical resin having required general properties such as transparency, thermal properties, mechanical properties and the like, while attaining a high refractive index.

A conventional technique concerning such a resin has been disclosed in Patent Document 1 (International Publication Pamphlet No. 2005/095490). In the Document, a thietane compound containing a metal has been disclosed. Furthermore, an optical resin having a high refractive index exceeding a refractive index (nd) of 1.7 has been disclosed.

Patent Document 1: International Publication Pamphlet No. 2005/095490
Patent Document 2: Japanese Patent Laid-open No. 2003-327583

DISCLOSURE OF THE INVENTION

However, in the technique as described in the aforementioned Patent Document 1, there has been room for more improvement from the viewpoint of improving the refractive index of a transparent resin.

The present invention relates to:

[1] a thietane compound represented by the following general formula (1),

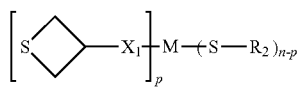

(wherein, in the above general formula (1), M represents an element belonging to Group 14 of the Periodic Table in the long form; $X_1$s each independently represent a sulfur atom or an oxygen atom; p represents an integer of equal to or more than 2 and equal to or less than (n-1); and n represents the number of valence of a metal atom M, provided that when n-p is 1, $R_2$ represents an alkyl group having a straight chain or a branched chain of equal to or more than 1 and equal to or less than 3 carbon atoms which may have a substituent; and when n-p is 2 or more, a plurality of $R_2$s each independently represent an alkyl group having a straight chain or a branched chain of equal to or more than 1 and equal to or less than 3 carbon atoms which may have a substituent or a plurality of $R_2$s may be bonded to each other to form a ring containing M in which the alkyl chain forming the ring has equal to or more than 1 and equal to or less than 3 carbon atoms and a portion constituting the ring does not contain a sulfur atom);

[2] the thietane compound as set forth in [1], wherein, in the general formula (1), $X_1$ is a sulfur atom;

[3] the thietane compound as set forth in [2], wherein the M is a Sn atom;

[4] the thietane compound as set forth in [3], wherein $R_2$ is a methyl group or a methylene group;

[5] a polymerizable composition containing the thietane compound as set forth in [1];

[6] use of the polymerizable composition as set forth in [5] as an optical component; and

[7] use of a resin obtained by polymerizing the polymerizable composition as set forth in [5] as an optical component.

According to the present invention, a novel thietane compound containing a thioalkyl group is provided.

BEST MODE FOR CARRYING OUT THE INVENTION

The present invention will be described with reference to concrete examples below. However, the present invention is not restricted to these concrete examples. Furthermore, in the present invention, as for respective components and groups, exemplified components and groups may be used singly or a plurality of kinds may be used in combination.

Firstly, the thietane compound of the present invention will be described.

The thietane compound of the present invention is a compound containing a thietane group and a metal atom in a molecule, and is represented by the following general formula (1),

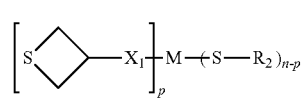

(wherein, in the above general formula (1), M represents an element belonging to Group 14 of the Periodic Table in the long form; $X_1$s each independently represent a sulfur atom or an oxygen atom; p represents an integer of equal to or more than 2 and equal to or less than (n-1); and n represents the number of valence of a metal atom M, provided that when n-p is 1, $R_2$ represents an alkyl group having a straight chain or a branched chain of equal to or more than 1 and equal to or less than 3 carbon atoms which may have a substituent; and when n-p is 2 or more, a plurality of $R_2$s each independently represent an alkyl group having a straight chain or a branched chain of equal to or more than 1 and equal to or less than 3 carbon atoms which may have a substituent or a plurality of $R_2$s may be bonded to each other to form a ring containing M in which the alkyl chain forming the ring has equal to or more than 1 and equal to or less than 3 carbon atoms and a portion constituting the ring does not contain a sulfur atom.)

In the above general formula (1), M represents an element belonging to Group 14 of the Periodic Table in the long form (hereinafter the same) such as a Sn atom, a Si atom, a Ge atom, a Pb atom or the like.

M is preferably a metal element of heavier Group 14 such as a Sn atom, a Pb atom or the like and further specifically a Sn atom.

In the above general formula (1), $X_1$s are each independently a sulfur atom or an oxygen atom. From the viewpoint of improving the refractive index of a resin obtained by polymerizing the polymerizable composition containing a thietane compound represented by the above general formula (1), $X_1$ is preferably a sulfur atom.

Further specifically, in the above general formula (1), $X_1$ may be a sulfur atom and M may be a Sn atom.

In the above general formula (1), n represents the number of valence of a metal atom M.

Furthermore, in the above general formula (1), p is a positive integer of not more than (number of valence of M-1). That is, p is an integer of equal to or more than 2 and equal to or less than (n-1).

$R_2$ represents an alkyl group having a straight chain or a branched chain of equal to or more than 1 and equal to or less than 3 carbon atoms which may have a substituent.

When n-p is 2 or more, $R_2$s each independently represent an alkyl group having a straight chain or a branched chain of equal to or more than 1 and equal to or less than 3 carbon atoms which may have a substituent. A plurality of $R_2$s may be the same group, or may be groups, all or part of which are different. Furthermore, a plurality of $R_2$s may be bonded to each other to form a ring containing M. At this time, the alkyl chain forming the ring has equal to or more than 1 and equal to or less than 3 carbon atoms and a sulfur atom is merely what is directly bonded to M. That is, of $R_2$s, a portion constituting the ring does not contain a sulfur atom.

When $R_2$s do not form a ring, concrete examples of $R_2$ include a methyl group, an ethyl group, a propyl group and an isopropyl group, that is, an alkyl group having equal to or more than 1 and equal to or less than 3 carbon atoms. Furthermore, when a ring is formed, examples of the alkyl chain forming the ring include a methylene group, an ethylene group and a propylene group, that is, an alkylene group having equal to or more than 1 and equal to or less than 3 carbon atoms. The ring containing M is specifically a 4-membered ring to a 6-membered ring. Incidentally, when the ring containing M is a 4-membered ring, one of the two $R_2$s constituting the ring is specifically a single bond.

Further specifically, when a ring is not formed, $R_2$ is a methyl group, while when a ring is formed, the alkyl chain forming the ring is an ethylene group. In the above general formula (1), further specifically, $X_1$ may be a sulfur atom, M may be a Sn atom, and $R_2$ may be a methyl group or a methylene group.

The compound represented by the above general formula (1) is further specifically exemplified as follows, but is not restricted thereto. Examples thereof include alkylthio(thietanylthio)tin such as methylthiotris(thietanylthio)tin, ethylthiotris(thietanylthio)tin, propylthiotris(thietanylthio)tin, isopropylthiotris(thietanylthio)tin and the like; bis(alkylthio)bis(thietanylthio)tin such as bis(methylthio)bis(thietanylthio)tin, bis(ethylthio)bis(thietanylthio)tin, bis(propylthio)bis(thietanylthio)tin, bis(isopropylthio)bis(thietanylthio)tin and the like; alkylthio(alkylthio)bis(thietanylthio)tin such as ethylthio(methylthio)bis(thietanylthio)tin, methylthio(propylthio)bis(thietanylthio)tin, isopropylthio(methylthio)bis(thietanylthio)tin, ethylthio(propylthio)bis(thietanylthio)tin, ethylthio(isopropylthio)bis(thietanylthio)tin, isopropylthio(propylthio)bis(thietanylthio)tin and the like; and bis(thietanylthio)cyclic dithiotin compounds such as bis(thietanylthio)dithiastannetane, bis(thietanylthio)dithiastannolane, bis(thietanylthio)dithiastanninane and the like.

Next, a method for producing a thietane compound represented by the above general formula (1) will be described.

The method for producing a thietane compound represented by the above general formula (1) is not particularly limited, and the thietane compound is produced, for example, by reacting a halide represented by the following general formula (2) with a hydroxy or a thiol compound having a thietane group represented by the following general formula (3),

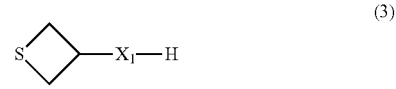

(wherein, in the above general formula (2), M, p, n and $R_2$ are each the same as M, p, n and $R_2$ in the above general formula (1); and Z represents a halogen atom),

(wherein, in the above general formula (3), $X_1$ is the same as $X_1$ in the above general formula (1).)

Meanwhile, the thietane compound can also be produced by reacting a halide in which n is p in the above general formula (2), a hydroxy or a thiol compound having a thietane group represented by the above general formula (3), and a thiol compound represented by the following general formula (4) at the same time, $$R_2\text{—SH} \qquad (4)$$

wherein, in the above general formula (4), $R_2$ is the same as $R_2$ in the above general formula (1).

Furthermore, the thietane compound can also be produced by reacting a compound obtained by reacting a halide in which n is p in the above general formula (2) with a hydroxy compound or a thiol having a thietane group represented by the above general formula (3) in advance, with a thiol compound represented by the above general formula (4).

Of the compounds to be used in the above-exemplified production methods, the compounds represented by the above general formulae (2) and (4) are available as an industrial raw material or a reagent for research purpose.

Furthermore, the compound represented by the above general formula (3) is a known compound and can be produced, for example, by the method as described in Patent Document 2 (Japanese Patent Laid-open No. 2003-327583).

Respective reactions in the above-exemplified production methods may be carried out in the absence of a solvent, or may be carried out in the presence of a solvent which is inactive to the reaction.

The solvents are not particularly limited as long as they are inactive to the reaction, and examples thereof include hydrocarbon solvents such as petroleum ether, hexane, benzene, toluene, xylene, mesitylene and the like; ether solvents such as diethyl ether, tetrahydrofuran, diethylene glycol dimethyl ether and the like; ketone solvents such as acetone, methyl ethyl ketone, methyl isobutyl ketone and the like; ester solvents such as ethyl acetate, butyl acetate, amyl acetate and the like; chlorine-containing solvents such as methylene chloride, chloroform, chlorobenzene, dichlorobenzene and the like; polar aprotic solvents such as N,N-dimethylformamide, N,N-dimethylacetamide, N,N-dimethylimidazolidinone, dimethyl sulfoxide and the like; alcoholic solvents such as methanol, ethanol, propanol, isopropanol and the like; and water and the like.

Furthermore, although the reaction temperature of each reaction in the above-exemplified respective production methods is not particularly limited, it is usually in the range of equal to or higher than −78 degrees centigrade and equal to or lower than 200 degrees centigrade and preferably equal to or higher than −78 degrees centigrade and equal to or lower than 100 degrees centigrade.

Furthermore, although the reaction time is affected by the reaction temperature, it is usually from several minutes to 100 hours.

In the reaction of exemplified respective production methods, although the amount of the compound represented by the above general formula (2) and the compound represented by the above general formula (3) used is not particularly limited, the amount of the compound represented by the above general formula (3) used is usually equal to or more than 0.01 moles and equal to or less than 100 moles based on 1 mole of the halogen atom contained in the compound represented by the above general formula (2). The amount is preferably equal to or more than 0.1 moles and equal to or less than 50 moles and more preferably equal to or more than 0.5 moles and equal to or less than 20 moles.

Further, when the reaction is carried out in exemplified respective production methods, it is preferable to use a basic compound as a capturing agent of the formed hydrogen halide in order to effectively carry out the reaction.

Examples of the basic compound include inorganic bases such as sodium hydroxide, potassium hydroxide, lithium hydroxide, ammonia water, sodium carbonate, potassium carbonate, lithium carbonate, sodium bicarbonate, potassium bicarbonate, lithium bicarbonate, magnesium hydroxide, calcium hydroxide and the like; and organic bases such as pyridine, triethylamine, dimethylaniline, diethylaniline, 1,8-diazabicyclo[5,4,0]-7-undecene, sodium methoxide, sodium ethoxide and the like.

Next, the polymerizable composition of the present invention will be described.

The polymerizable composition of the present invention contains a thietane compound represented by the above general formula (1). This polymerizable composition is used, for example, as a material of an optical component.

In the present invention, the ratio of the thietane compound represented by the above general formula (1) in the polymerizable composition is not particularly limited, and is properly determined depending on desired physical properties.

The polymerizable composition of the present invention may contain one compound as a thietane compound represented by the above general formula (1) or may contain a plurality of different compounds.

Furthermore, the thietane compound represented by the above general formula (1) is a polymerizable compound. Accordingly, the polymerizable compound in the polymerizable composition of the present invention may be composed of the thietane compound represented by the above general formula (1).

Furthermore, the polymerizable compound in the polymerizable composition of the present invention may contain other polymerizable compounds in addition to the thietane compound represented by the above general formula (1), or a plurality of polymerizable compounds may be used in combination.

Examples of other polymerizable compounds include various polymerizable monomers or polymerizable oligomers known in the art. Examples thereof include a (meth)acrylic acid ester compound, a vinyl compound, an epoxy compound, an episulfide compound, an oxetane compound, a thietane compound, a thiourethane compound consisting of an isocyanate compound and a thiol compound, and the like.

The polymerizable composition of the present invention may further contain, if necessary, a known or used polymerization catalyst in order to control the polymerization rate or the like.

Furthermore, in some cases, in order to obtain a good resin, a method or operation generally used for synthesizing an organic compound, such as purification, washing, thermal insulation, cold storage, filtration, reduced-pressure treatment or the like is preferably performed for the polymerizable composition of the present invention, or a known compound or the like is preferably added as a stabilizer or a resin modifier for improving a resin and handleability, for example, for controlling the optical properties such as the refractive index, Abbe's number and the like, physical properties such as hue, light resistance, weather resistance, heat resistance, impact resistance, hardness, specific gravity, linear expansion coefficient, polymerization shrinkability, water absorption, hygroscopicity, chemical resistance, viscoelasticity and the like, and transmittance and transparency of a resin produced by curing the polymerizable composition, and controlling the viscosity of the polymerizable composition, and preservation and transport handleability. Examples of the compound added for improving stability such as long-term preservation stability, polymerization stability and thermal stability include a polymerization retardant, a polymerization inhibitor, a deoxidant, an antioxidant and the like.

Purification of the polymerizable composition is a means used for improving the transparency of the resin obtained by curing, improving the hue of the resin or increasing the purity thereof. As a method for purifying the polymerizable composition of the present invention, any known method, for example, recrystallization, column chromatography (a silica gel method, an activated carbon method, an ion-exchange resin method or the like), extraction or the like, may be performed with any timing as long as the transparency and hue of the resin obtained by curing the purified composition are improved.

As a method for washing the polymerizable composition, a method for improving the transparency and hue of the resin obtained by curing may be used with timing when or after the synthesized polymerizable composition is taken out. In this method, the composition is washed with a polar and/or nonpolar solvent to remove or reduce a resin transparency inhibitor, for example, an inorganic salt used for synthesizing the polymerizable composition or by-produced in synthesizing the composition, such as an ammonium salt or the like. Although the solvent in use depends on the polymerizable composition to be cleaned and the polarity of a solution containing the polymerizable composition, and is not limited, a solvent which can dissolve a component to be removed, and which is hardly compatible with the polymerizable composition to be cleaned and the solution containing the polymerizable composition is preferably used. The solvent may be used singly, or a mixture of two or more solvents may be used. Although the amount of a component to be removed depends on the purpose and application, the amount is preferably as low as possible. The amount is usually not more than 5,000 ppm and more preferably not more than 1,000 ppm. In this case, good results are produced in some cases.

As thermal insulation, cold storage or filtration method for the polymerizable composition, a method for improving the transparency or hue of the resin obtained by curing is generally used with timing when or after the synthesized polymerizable composition is taken out. In the hot insulation method, for example, when the polymerizable composition is crystallized to deteriorate handleability during storage, the polymerizable composition is melted by heating within a range causing no deterioration in the performance of the polymerizable composition and the resin obtained by curing the polymerizable composition. Although the heating temperature range and heat melting method depend on the structure of the compound constituting the polymerizable composition to be handled and are not limited, the heating temperature is generally in a range of the solidification point +50 or lower degrees centigrade and preferably the solidification point +20 or lower degrees centigrade. In this method, the composition may be melted by mechanically stirring with a stirring device or bubbling with an inert gas for moving an internal liquid. The cold insulation method is generally performed for improving the preservation stability of the polymerizable composition. However, when the polymerizable composition has a high melting point, consideration may be given to the storage temperature to improve handleability after crystallization. Although the cold insulation temperature depends on the structure and preservation stability of the compound constituting the polymerizable composition to be handled and is not limited, the polymerizable composition of the present invention needs to be stored at a temperature or below which can maintain the stability thereof.

Further, the polymerizable composition of the present invention used for optical applications is required to have excessively high transparency, and thus the polymerizable composition may be usually filtered with a filter having a small pore size. Although the pore size of the filter used herein is usually equal to or greater than 0.05 μm and equal to or smaller than 10 μm, the pore size is preferably equal to or greater than 0.05 μm and equal to or smaller than 5 μm and more preferably equal to or greater than 0.1 μm and equal to or smaller than 3 μm from the viewpoints of operationality and performance. The polymerizable composition of the present invention is no exception in many cases in that filtration leads to good results. Although a low filtration temperature near the solidification temperature produces more desirable results in some cases, filtration is preferably performed at a temperature causing no trouble in the filtration work when solidification proceeds during filtration in some cases.

The reduced-pressure treatment is a general means for removing a solvent, dissolved gas and odor which deteriorate the performance of the resin produced by curing the polymerizable composition. Since a dissolved solvent generally decreases the refractive index of the resultant resin or deteriorates the heat resistance thereof, the dissolved solvent may be removed as much as possible. Although the allowable amount of the dissolved solvent depends on the structure of the compound constituting the polymerizable composition to be handled and the structure of the dissolved solvent, and cannot be completely limited, the allowable amount is usually preferably not more than 1% and more preferably not more than 5,000 ppm. The dissolved gas inhibits polymerization or causes the problem of mixing bubbles in the resultant resin, and is thus preferably removed. Particularly, a moisture gas such as water vapor or the like is preferably removed by bubbling with a dry gas. The amount of the dissolved gas can be determined depending on the structure of the compound constituting the polymerizable composition, and the physical properties, structure and kind of the dissolved gas.

As a typical method for producing the polymerizable composition according to the present invention, an example thereof includes a method in which the compound represented by the above general formula (1) and, if necessary, the aforementioned various other polymerizable compounds are used together, and further, if necessary, the polymerization catalyst is added thereto, and then the resultant is mixed and melted.

The resultant polymerizable composition is useful, for example, as a raw material monomer composition for use in a transparent resin having an extremely high refractive index.

Furthermore, the resultant polymerizable composition can be usually polymerized and cured according to a known method for polymerizing a thietane group-containing compound.

The kind and amount of the polymerization catalyst used for obtaining a cured resin, and the kind and ratio of the monomer are determined depending on the structure of the compound constituting the polymerizable composition.

In curing and molding the polymerizable composition of the present invention, a known molding method may be used according to purposes, and various substances, such as a stabilizer, a resin modifier, a chain extender, a crosslinking agent, a light stabilizer including a typical hindered amine light stabilizer (HALS), an ultraviolet absorber including a typical benzotriazole ultraviolet absorber, an antioxidant including a typical hindered phenol antioxidant, a coloring inhibitor, a dye including a typical anthraquinone based disperse dye or a bluing agent, a filler, an external mold releasing agent including a typical silicone type external mold releasing agent or an internal mold releasing agent including a typical surface active agent such as acidic phosphate ester, quaternary ammonium salt, quaternary phosphonium salt internal mold releasing agent or the like, an adhesion improving agent and the like may be added. Herein, the internal mold releasing agent includes those catalysts exhibiting the mold release effect among the aforementioned various catalysts.

Although the amount of each of the aforementioned various additives which can be added is different depending on the kind, structure and effect of each additive, and cannot be completely limited, the adding amount is usually in the range of equal to or more than 0.001 weight % and equal to or less than 10 weight % and preferably in the range of equal to or more than 0.01 weight % and equal to or less than 5 weight %, based on the total weight of the polymerizable composition. The dye and the bluing agent are preferably used in the range of equal to or more than 1 ppb and equal to or less than 100 ppm. Within these ranges, a sufficiently cured resin can be produced, and the obtained resin has good transparency and optical properties in some cases.

The resin is obtained by polymerization of the aforementioned polymerizable composition. Examples of the polymerization method include various known methods used when producing plastic lenses. A typical method includes a casting polymerization.

When casting polymerization of the polymerizable composition of the present invention is carried out, the polymerizable composition is degassed under reduced pressure or filtered off using a filter as required, and then the polymerizable composition is filled a mold with, and if necessary, heated for carrying out polymerization. In this case, it is preferable to carry out polymerization by slowly heating from a low temperature to a high temperature.

The aforementioned mold is composed of, for example, two pieces of mirror surface-ground molds via a gasket made of polyethylene, an ethylene vinyl acetate copolymer, polyvinyl chloride and the like. Typical examples of the mold include, though not restricted to, combined molds such as glass and glass, glass and plastic plate, glass and metal plate, and the like. The mold may comprise two pieces of molds fixed by a tape such as a polyester adhesive tape or the like. A known method such as the mold release process may be performed for the mold, if necessary.

When carrying out the casting polymerization, the polymerization temperature is affected by the polymerization conditions such as the kind of a polymerization initiator and the like, and is not particularly limited. But, it is usually equal to or higher than −50 degrees centigrade and equal to or lower than 200 degrees centigrade, preferably equal to or higher than −20 degrees centigrade and equal to or lower than 170 degrees centigrade and more preferably equal to or higher than 0 degrees centigrade and equal to or lower than 150 degrees centigrade.

Although the polymerization time is affected by the polymerization temperature, it is usually equal to or longer than 0.01 hours and equal to or shorter than 200 hours and preferably equal to or longer than 0.05 hours and equal to or shorter than 100 hours. Polymerization can also be carried out in combination of several temperatures by conducting fixed temperature, temperature elevation, temperature dropping and the like as required.

Furthermore, the polymerizable composition of the present invention can also be polymerized by applying the active energy line such as an electron beam, ultraviolet light, visible light or the like in some cases. At this time, a radical polymerization catalyst or a cationic polymerization catalyst for initiating polymerization by the active energy line is used as required.

After the thus-obtained resin is cured, it may be subjected to an annealing process as required. Furthermore, for purposes of anti-reflection, high hardness grant, wear resistance improvement, anti-fogging property grant or fashionability grant, various known physical or chemical processes such as surface polishing, antistatic process, hard coat process, non-reflective coat process, tinting process, photochromic process (for example, photochromic lens process and the like) and the like may be performed, if necessary.

The resin obtained by polymerization of the polymerizable composition of the present invention has high transparency, good heat resistance and mechanical strength, and has a high refractive index. The resin is useful, for example, as a resin used for an optical component such as a plastic lens or the like.

Examples of the optical component include various plastic lenses such as a spectacle lens for vision correction, a lens for cameras, a Fresnel lens for liquid crystal projectors, a lenticular lens, a contact lens and the like; a sealing material for alight emitting diode (LED); an optical waveguide; an optical adhesive used for the junction of an optical lens and an optical waveguide; an anti-reflection layer to be used for an optical lens; and transparent coating or transparent substrate used for a liquid crystal display member such as a substrate, a light guiding plate, a film, a sheet and the like.

Mode for the Invention

The present invention is now illustrated in detail below with reference to Preparation Examples and Examples. However, the present invention is not restricted to these Examples.

REFERENCE PREPARATION EXAMPLE 1

According to the method as described in Patent Document 2 (Japanese Patent Laid-open No. 2003-327583), 3-thiethanol was synthesized. Furthermore, the resulting 3-thiethanol was used to synthesize 3-mercaptothietane.

Namely, into a reactor equipped with a stirring device and a thermometer were added 190 g of thiourea, 253 g of 35 weight % hydrochloric acid solution and 250 g of water, and the resulting mixture was stirred to give a reaction solution. While the reaction solution was stirred, 156 g of 3-thiethanol was added dropwise to the reaction solution over 1 hour. After completion of the dropwise addition, the resulting solution was stirred at 30 degrees centigrade for 24 hours for carrying out the reaction, and then 177 g of 24 weight % ammonia water was added dropwise thereto over 1 hour. The solution was further reacted at 30 degrees centigrade for 15 hours, and then allowed to stand for taking out an organic layer (under layer) to obtain 134 g of a crude product. The resultant crude product was distilled off under reduced pressure to collect a fraction of a boiling point of 40 degrees centigrade under 106 Pa to obtain the desired product of a colorless transparent liquid, that is, 3-mercaptothietane.

REFERENCE PREPARATION EXAMPLE 2

According to the method as described in Patent Document 1 (International Publication Pamphlet No. 2005-095490), the following compound was prepared.

Specifically, 5.42 g (0.051 mole) of 3-mercaptothietane and 4.01 g (0.026 mole) of mercaptoethyl sulfide were introduced into 50 g of pure water, and subsequently the reaction solution was heated to 30 degrees centigrade. 65.2 g (corresponding to 0.025 mole of tin tetrachloride) of an aqueous solution of 10% tin tetrachloride was introduced dropwise thereto at the same temperature over 4 hours.

After completion of the dropwise addition, the resulting solution was further stirred at the same temperature for 2 hours. 100 ml of chloroform was added to this reaction mixture for separating an organic layer and an aqueous layer. The organic layer was washed twice with 100 ml of pure water and then dried using anhydrous sodium sulfate. The solvent was distilled off from this extract and the resulting crude product was purified by silica gel column chromatography with a developing solution of chloroform to obtain 8.42 g (Yield: 70%) of the compound represented by the following formula.

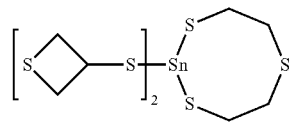

The $^1$H-NMR data is shown below (Solvent: CDCl$_3$, Internal Standard Substance: TMS); σ2.91 (4H), σ3.11 (4H), σ3.28~3.56 (8H), σ4.79 (2H).

REFERENCE PREPARATION EXAMPLE 3

In this Example, tetrakis(thietanylthio)tin (a compound represented by the following formula) was synthesized.

11.2 g (0.11 mole) of 3-mercaptothietane was introduced into 50 g of pure water, and subsequently 41.2 g (0.10 mole) of an aqueous solution of 10% NaOH was introduced dropwise into the mixture at room temperature over 40 minutes. Next, the reaction solution was heated to 30 degrees centigrade, and 65.2 g (corresponding to 0.025 mole of tin tetrachloride) of an aqueous solution of 10% tin tetrachloride was added dropwise thereto at the same temperature over 4 hours. After completion of the dropwise addition, the resulting solution was further stirred at the same temperature for 2 hours. 100 ml of chloroform was added to this reaction mixture for separating an organic layer and an aqueous layer. The organic layer was washed twice with 100 ml of pure water and then dried using anhydrous sodium sulfate. The solvent was distilled off from this extract to obtain 13.4 g (Yield: 99%) of the compound represented by the following formula.

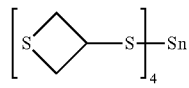

Example 1

13.7 g (0.13 mole) of 3-mercaptothietane was introduced into 35.1 g of pure water, and subsequently 16.5 g (0.13 mole) of an aqueous solution of 31 weight % NaOH was introduced dropwise into the mixture at room temperature (20 degrees centigrade) over 45 minutes. Next, 58.88 g (corresponding to 0.06 mole of tin tetrachloride) of an aqueous solution of 27.5 weight % tin tetrachloride and an aqueous solution of 15 weight % methyl mercaptan sodium salt were introduced dropwise thereto at the same dropping rate over 1.5 hours. After completion of the dropwise addition, the resulting mixture was further stirred for 2 hours.

This reaction mixture was dissolved in 300 g of dichloromethane, an organic layer was washed three times with 100 g of pure water, and then filtered using a Teflon (registered trademark) filter for removing the insoluble material. The solvent was distilled off from the thus-obtained extract to obtain 23.4 g (Yield: 64%) of methylthiotris(thietanylthio)tin represented by the following formula.

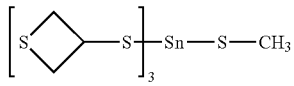

The identification data of the compound is shown below.
$^1$H-NMR (Solvent: CDCl$_3$, Internal Standard Substance: TMS); σ2.37 (3H), 3.44 (12H), 4.71 (3H).
$^{13}$C-NMR (solvent: CDCl$_3$); σ10.9, 39.2, 41.4.
IR (Universal ATR method); 2919, 1425, 1249, 1164, 946 cm$^{-1}$.
FDMS; m/e Calculated Value C$_{10}$H$_{18}$S$_7$Sn (M$^+$) 482, Measured Value 482.

Example 2

13.7 g (0.13 mole) of 3-mercaptothietane was introduced into 20.5 g of pure water, and subsequently 16.5 g (0.13 mole) of an aqueous solution of 31 weight % NaOH was introduced dropwise into the mixture at room temperature (20 degrees centigrade) over 45 minutes. Next, 5.9 g (0.06 mole) of ethanedithiol and 36.5 g of pure water were introduced into another reactor, and 16.5 g (0.13 mole) of an aqueous solution of 31 weight % NaOH was introduced dropwise into the mixture at room temperature over 45 minutes. This aqueous solution of ethanedithiol sodium salt and 58.9 g (corresponding to 0.06 mole of tin tetrachloride) of an aqueous solution of 27.5 weight % tin tetrachloride were introduced dropwise into the above aqueous solution of 3-mercaptothietane sodium salt at the same dropping rate over 1.5 hours. After completion of the dropwise addition, the resulting mixture was further stirred for 2 hours.

A solid of this reaction mixture was collected by filtration and dissolved in 530 g of dichloromethane. An organic layer was washed three times with 100 g of pure water, and then filtered using a Teflon (registered trademark) filter for removing the insoluble material. The solvent was distilled off from this extract to obtain 24.8 g (Yield: 65%) of bis(thietanylthio)dithiastannolane represented by the following formula as an oily crude product.

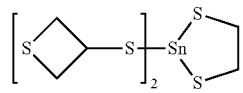

The identification data of the compound is shown below.
$^1$H-NMR (Solvent: CDCl$_3$, Internal Standard Substance: TMS); σ3.23 (4H), 3.27 (4H), 3.67 (4H), 4.64 (2H).
IR (Universal ATR method); 2931, 1414, 1262, 1165 cm$^1$.
FDMS; m/e Calculated Value C$_8$H$_{14}$S$_6$Sn(M$^+$) 422, Measured Value 422.

Example 3

18.84 g (0.2 mole) of 1,2-ethanedithiol was introduced into 107.9 g (0.2 mole) of tetrakis(thietanylthio)tin prepared in Reference Preparation Example 3, and the resulting mixture was stirred at room temperature (20 degrees centigrade) for 2 hours. In order to remove the by-produced 3-mercaptothietane, methanol was introduced, each time of introducing in an amount of 100 g, and the resulting solution was stirred and washed. In this way, a separation operation was repeatedly carried out 8 times by decantation to precipitate a white solid. The precipitated solid was collected by filtration and dried to obtain 70.6 g (Yield: 84%) of bis(thietanylthio)dithiastannolane as a white crystal.

The analyzed values of the obtained compound were the same as those of the compound obtained in Example 3.

(Preparation of Polymerizable Composition and Resin Cured Product Obtained by Polymerization Thereof)

The physical properties of the resins prepared in Reference Preparation Example 2, Examples 1 and 2 were evaluated in the following manner.

Appearance: Transparency was visually confirmed.
Refractive Index: It was measured at 20 degrees centigrade using a Pulfrich refractometer.

Example 4

10.0 g of the compound prepared in Example 1 was weighed in a glass beaker at room temperature (25 degrees centigrade). Without adding a polymerization catalyst, the resulting solution was heated to 50 degrees centigrade, filtered using a Teflon (registered trademark) filter, and then thoroughly degassed under reduced pressure of not more than 3.9 kPa until no bubble was observed. After a mold composed of a glass mold and a tape was filled with the obtained polymerizable composition, the resultant was put into a heating oven, and polymerized at 70 degrees centigrade for 48 hours.

A molding sample piece of the obtained resin was excellent in transparency and had good appearance with no distortion.

Furthermore, the refractive index of the obtained resin was measured and as a result, the refractive index ne was 1.793. The resin had a high refractive index as compared to that in Comparative Example 1 to be described below.

Example 5

10.0 g of the compound prepared in Example 2 was weighed in a glass beaker at room temperature (25 degrees centigrade). Without adding a polymerization catalyst, the resulting solution was heated to 50 degrees centigrade, filtered using a Teflon (registered trademark) filter, and then thoroughly degassed under reduced pressure of not more than 3.9 kPa until no bubble was observed. After a mold composed of a glass mold and a tape was filled with the obtained polymerizable composition, the resultant was put into a heating oven and polymerized at 70 degrees centigrade for 48 hours.

A molding sample piece of the obtained resin was excellent in transparency and had good appearance with no distortion.

Furthermore, the refractive index of the obtained resin was measured and as a result, the refractive index ne was 1.816. The resin had a high refractive index as compared to that in Comparative Example 1 to be described below.

Comparative Example 1

30 g of the compound prepared in Reference Preparation Example 2 was weighed in a glass beaker at room temperature (25 degrees centigrade). Without adding a polymerization catalyst, the resulting solution was filtered using a Teflon (registered trademark) filter, and then thoroughly degassed under reduced pressure of not more than 1.3 kPa until no bubble was observed. After a mold composed of a glass mold and a tape was filled with the obtained polymerizable composition, the resultant was put into a heating oven and polymerized for 20 hours.

During polymerization, the inside of the oven was heated from 85 to 120 degrees centigrade in multiple stages.

A molding sample piece of the obtained resin was excellent in transparency and had good appearance with no distortion.

Furthermore, the refractive index of the obtained resin was measured and as a result, the refractive index ne was 1.782.

The invention claimed is:

1. A process for producing bis(thietanylthio)dithiastannolane of the following formula:

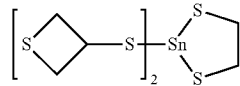

comprising reacting tetrakis(thietanylthio)tin having the following formula:

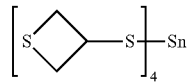

with 1,2-ethandiethiol.

2. A process according to claim 1 in which 1,2-ethanedithiol is added to tetrakis(thietanylthio)tin in an amount of 0.2 moles of 1,2-ethanedithiol per 0.2 moles of tetrakis(thietanylthio)tin, and the resulting mixture is stirred at room temperature for 2 hours.

* * * * *